3,657,336
NITROSO TERPOLYMERS AND THEIR PREPARATION

Nathan Mayes, Ironia, and Joseph Green, Dover, N.J., assignors to Thiokol Chemical Corporation, Bristol, Pa.
No Drawing. Original application Oct. 24, 1965, Ser. No. 505,057. Divided and this application July 19, 1967, Ser. No. 662,248
Int. Cl. C07c 53/36
U.S. Cl. 260—539                   11 Claims

ABSTRACT OF THE DISCLOSURE

Terpolymers produced by contacting polyhalonitrosoalkanes, polyfluoroalkanes, and monobasic unsaturated acids having, preferably, ethylenic linkages.

---

This invention relates to novel liquid nitroso polymers and to their preparation, and the application for patent therefor is a division of pending application of Nathan Mayes and Joseph Green, S.N. 505,057, filed Oct. 24, 1965, now U.S. Pat. 3,393,104.

More particularly, this invention concerns terpolymers produced by contacting polyhalonitrosoalkanes, polyfluoroalkanes and monobasic unsaturated acids having ethylenic linkages. These terpolymers are low molecular weight liquids containing curing sites especially useful as solid propellant fuel binders, explosive fuel binders and chemically resistant coatings and have some application for industrial and residential elastomer uses.

There is no dearth of polymers suitable for ordinary applications. However, because of certain peculiar requirements there is a shortage of superior polymer fuel binders suitable for use in propellant and gas generating compositions. For this purpose, the fuel binder must be in the liquid state during formulation, it must be compatible (i.e., inert) toward propellant oxidizers and propellant adjuvants, it must be readily cured at moderate temperatures comparatively rapidly and the cured propellant or gas generator charge must have good ageing, resiliency, tensile strength and other desirable physical characteristics. In addition to these requirements, the fuel binder must be highly energetic and remain operational through extremes of tropic and arctic temperatures. Because of these stringent requirements few conventional polymers are suitable for propellant applications. One potentially valuable group of polymers would be those containing nitroso (NO) groups. These materials possess certain advantageous characteristics which make them useful for this purpose. These are good compatability, upon combustion and resistance on the part of the cured binder to high and low temperature extremes. Unfortunately, until this time, most of the useful nitroso containing polymers available, even in limited quantities have had certain deficiencies which make them unsuitable as propellant fuel binders. For instance, many of the nitroso containing materials are solid, high molecular weight polymers not easily curable, or curable only with exotic and costly curing agents. Further, the energy value of the nitroso groups is negligible. It has been found quite unexpectedly that the utilization of polymers combining the nitroso function with a fluorocarbon polymer offers substantial advantages heretofore unrealized. For instance, the use of fluorocarbon polymers for hydrocarbon polymers substantially increases the available overall energy of the system. In addition, whereas known fluorocarbon resins per se cannot be cured to elastomers, the inventive terpolymers containing nitroso groups can be cured to flexible polymers. Finally, the presence of the nitroso group in the polymer molecule imparts the low temperature characteristics desirable in operational propellants.

Thus it is an object of this invention among many others to prepare a novel class of low molecular weight halogenated terpolymers.

It is another object of this invention to prepare the above terpolymers especially useful as highly energetic and stable propellant and gas generator binders.

A further object of this invention is the preparation of fluorinated terpolymers useful in certain industrial applications.

Additional objects are the preparation of chemically resistant materials which can be cured at low temperatures using polyimine, polyepoxide and metal salt curing agents of the prior art.

These objects, among others, are achieved by the preparation described more fully below:

In practice, three reactants, polyhalogenated nitrosoalkanes, polyfluorinated alkylenes and monobasic unsaturated acids are brought together in the environment of polyhalogenated alkane solvent(s) until reaction takes place and the terpolymer product is formed. The solvent is removed and the terpolymer isolated. Curing can be accomplished with conventional polyimine or polyepoxide curing agents of the prior art. The extent of cure is determined by the ultimate application and the convenience of the formulator.

In the preferred practice, $CF_3NO$, $C_2F_4$ and acrylic acid ($CH_2=CHOOH$) are coreacted in the presence of a polyhalogenated alkane solvent at about 15–35° C. until the liquid terpolymer having a molecular weight of between about 1000–5000 molecular weight is produced. After the reaction is complete, the solvent and volatiles are removed leaving the viscous, uncured terpolymer product.

Among the many polyhalogenated-nitrosoalkanes which can be utilized as reactants in addition to the preferred $CF_3NO$ are the following: $HCF_2CF_2NO$, $H_2CFCF_2NO$, $CF_3CF_2CF_2NO$, $CF_3CH_2CF_2NO$ as well as the corresponding chlorinated and brominated analogues wherein chlorine and/or bromine replace the fluorine and/or hydrogen atoms.

Among the various polyhalogenated ethylenes which can be used are the favored tetrafluoroethylene, as well as the mixed haloethenes such as fluorotrichloroethylene, the difluorodichloroethylenes, trifluorochloroethylene including the corresponding bromo and mixed bromoethylenes.

In addition to the preferred acrylic acid reactant higher and halogenated homologues can be used as reactants. These include the following structures: $CF_2=CHCOOH$, $CF_2=CFCOOH$, $CH_3CH=CHCOOH$ $CF_3CH=CHCOOH$, $CH_3CH=C(CH_3)COOH$ $CF_3CH=C(CH_3)COOH$, as well as the corresponding chloro and bromo analogues wherein chlorine and bromine either entirely or partially replace the fluorine and/or hydrogen atoms.

As indicated earlier, various modifications are possible in the process without departing from the inventive concept. For example, the ratios of the three components in the polymer can be varied to some extent by adjusting the ratios of these components in the monomer feed. Thus, an increase in the ratio of unsaturated monobasic acid component in the monomer feed leads to an increase of the ratio of this component in the polymer. The preferred molar ratio in the monomer feed is one in which the polyhalonitrosoalkane, polyfluoroethylene and acrylic acid components are in 10:9:1 molar proportions. Under these conditions the resultant terpolymer will contain about 1 mole percent of unsaturated acid.

While ordinarily it is preferred to form the terpolymer by contacting the three components at about 15–35° C. in the presence of a polyhalogenated alkane solvent, higher and lower (about 0–50° C.) temperatures can be employed if desired. However, little advantage is observed in operating beyond the preferred about 15–35° C. range. Similarly, no need is seen to use other than atmospheric or near atmospheric pressures. Temperature cannot readily be stated in precise terms; however, using the preferred ratio of components and operating within about 15–35° C. with acrylic acid, tetrafluoroethylene and trifluoronitrosomethane as the reactants, the reaction in small scale batches will be complete in less than 24 hours, but no more than 48 hours. Longer reaction times however, are not harmful and in some instances are desirable.

In general any of the polyhalogenated alkane solvents can be used. These include among many others 1,1,2-trichloro-1,2,2-trifluoroethane, 1,2-dibromo - 1,1,2,2-tetrafluoroethane, trichloromethane and the like.

The curing of the polymeric terpolymer products of this invention is analagous to that used in curing carboxyl containing polymers of the art. That is, temperatures from about 50° C. to about 100° C. or higher are used. The usual curing agents such as polyimines and polyepoxides are employed. Metal salts may also be used. Numerous listings of the curing agents appear in the technical and patent literature. A preferred group of curing agents are the tris(aziridinyl) phosphinyl oxides and sulfides sold by the Interchemical Corporation. However, since the method of curing the novel binders of this invention is not the novel feature of this invention, no attempt will be made to describe these procedures in detail. It shall suffice to direct the attention of the reader to certain literature such as U.S. Pats. 3,147,161 (Abere) and 3,155,552 (Vriesen) for more detailed discussions.

To illustrate the invention in greater detail the following typical embodiments showing the preparation and formulation of the invention terpolymers are submitted.

In one embodiment, 5 parts by weight of

$CF_2=CFCOOH$ dissolved in 100 parts by weight of trichlorotrifluorethane and 100 parts by weight of dibromoetetrafluoroethane is degassed and cooled by immersion in liquid nitrogen. To the solvent solution is added 70 parts by weight of vacuum distilled trifluoronitrosomethane and 62 parts by weight of tetrafluoroethylene. The reaction mitxure is sealed, agitated and allowed to warm up with continuous agitation. After 24 hours of agitation at 25° C., the reaction is halted and the solvent and volatile products stripped off, under vacuum. A viscous liquid tripolymer of 2500–3500 molecular weight is obtained. A portion of the above polymer is cured with tris-(methylaziridinyl) phosphine sulfide by heating at 70° C. for 24 hours.

In another embodiment of this invention another terpolymer is prepared by repeating the above reaction except that 5 parts by weight of $CF_3CF=CFCOOH$ is used as the acrylic acid type reactant. The same other reactants, solvents and reaction conditions are utilized and the same curing procedure and curing agent is utilized to obtain a cured rubber.

In an additional embodiment a solution of 5 parts by weight of $CH_2=CHCOOH$ in 200 parts by weight of 1,1,2-trichloro, 1,2,2-trifluoroethane is prepared and degassed. To the degassed solution is added 80 parts by weight of vacuum distilled chlorodifluorotrosomethane and 78 parts by weight of tetrafluoroethylene. The reactant mixture maintained at 30° C. for 30 hours is then stripped of volatiles to yield a viscous liquid terpolymer having a molecular weight of between 3000 to 4500. This mixture is curable with the above tris(methylaziridinyl) phosphine oxides at between 50–90° C. or higher to give a product varying in characteristics from a gum to a tough rubber dependent upon the curing agent concentration.

The above embodiment is substantially repeated except that trifluorochloroethylene is substituted on a weight by weight basis for tetrafluoroethylene. Again a low molecular weight viscous liquid is obtained.

As indicated earlier the low molecular weight terpolymer products of this invention are especially suitable as combustible fuel binders for solid propellants.

When used for this purpose, the uncured binder (10 to 40 parts by weight) is admixed with 25 to 85 parts by weight of oxidizer and up to from about 25 parts by weight of various optional propellant adjuvants. It should be understood that the amounts of the propellant components given do not represent absolute amounts but rather the relative proportions that are used. Clearly fractional portions of these ranges or multiples of them are equally satisfactory.

The admixture of the propellant components is accomplished by blending until a homogenous mixture is obtained, usually within several hours of mixing. However, longer blending times are not harmful. The uncured propellant is then placed into the rocket or gas generator motor and cured to the desired state at about 50° to 100° C. temperature range previously specified. The above brief discussion gives somewhat more detail as to equivalency of the propellant components.

Oxidizers.—The preferred oxidizers that are used in the instant propellant compositions are the inorganic propellants particularly ammonium perchlorate and the alkali metal perchlorates. In addition, various other perchlorates, nitrates and chlorates, inorganic or organic can be used. These include ammonium nitrate, nitronium perchlorate, hydrazinium nitrate, RDX (Cyclonite) or $(CH_2)_3N_3(NO_2)_3$ and the like.

Curing agents, curing catalysts, etc.—The quantities of binder cured in the inventive, propellant compositions (10 to 40 parts by weight) includes the various curing agents and catalysts employed in curing the inventive polymers to the desired state.

Propellant adjuvants.—In addition to the curing agents, solvents, polymerization and curing agents catalysts and the like which are included within the fuel binder content of the inventive gas generating compositions, certain conditioning or modifying agents can often be advantageously added to gas-generating compositions to alter or improve their physical and combustion characteristics. For convenience sake, these substances are herein generically referred to as propellant adjuvants and they can be present in the finished gas generating composition in amounts from up to about 30 parts by weight down to 0 part by weight of the final gas generating composition.

More commonly, however, the adjuvants comprise from about 0.25 part by weight or even less, up to about 5 parts by weight of the gas generating composition. Among the many propellant adjuvants which can be used are included the following typical materials: plasticizers such as the alkylphthalates and the like, and darkening agents such as carbon black or lamp black, ballistic agents such as ferrocene, alkyl ferrocenes, hygroscopicity inhibiters such as magnesium oxide and various combustion catalysts. The combustion catalysts are of diverse structure but generally are compounds containing oxygen. These catalysts can be inorganic or organic compounds. They include, among many others, oxides, such as magnesium, iron, copper, titanium, calcium, molybdenum, and vanadium oxides and the like. Especially effective as combustion catalysts are the chromates and dichromates, generally with ammonium dichromate being a preferred catalyst. Other satisfactory combustion catalysts include metallo organics such as iron and cobalt dicyclopentadienyl, and ferric and cobalt acetyl acetonate and certain dyes including copper phthalocyanine. Organics such as nitrocellulose can also be effectively used. In addition to the above adjuvants, numerous metals can be incorporated into the propellant mix prior to curing. These include metals such as lithium, magnesium, aluminum, beryllium, titanium, zirconium, or mixtures of these metals, preferable in the form of their powders. Another valuable group of high energy additives which can be used include the metalloids such as silicon and/or boron, the carbides and hydride of silium and boron as well as the silicides, carbides and hydrides of metals such as beryllium, aluminum, lithium, magnesium and the like.

As indicated in the afore-going discussion and the described embodiments numerous advantages accrue from the subject invention in both its process and product aspects.

For instance because of the presence of the polyhalogenated alkane solvent, chain length is curtailed and the production of a low molecular weight (below about 5000) liquid polymer with carboxyl curing sites is assured. In addition, unlike higher molecular weight nitrogen polymers of the prior art the low molecular weight polymers of this invention can be cured using conventional curing agents such as the tris(aziridinyl) phosphine oxides and sulfides. Since the choice of curing agent and the degree of cure influence the physical characteristics of the cured polymer greater flexibility of polymers product can be obtained.

In its product aspects, the novel terpolymers of this invention are also advantageous. For example, when cured with the tris(aziridinyl) phosphine oxide (MAPO) sample having good modulus of elasticity, shore hardness, stress and strain are obtained.

Further, when the terpolymers are formulated with oxidizer and propellant adjuvants good compatability is observed and the resultant "MAPO" cured solid propellant has the afore-described desirable physical properties.

To best illustrate this invention in the greatest possible detail, the following example showing the preparation of a preferred terpolymer in which the trihalonitrosomethane and tetrafluoroethylene reactants are in substantially equimolar ratios.

EXAMPLE 1

Preparation of a preferred terpolymer (A) Freshly distilled acrylic acid, 0.72 g. (0.01 mole) is added to the solvent mixture, trichlorotrifluoroethane, 20 g. and dibromotetrafluoroethane, 20 g. in an appropriate reaction vessel. The solution is degassed by alternately freezing, evacuating and thawing. To the degassed solution cooled with liquid nitrogen is added, by distillation in vacuum, trifluoronitrosomethane 9.9 g. (0.1 mole) and tetrafluoroethylene, 9.0 g. (0.09 mole). The reacton vessel is sealed, placed on a shaker and allowed to warm to 25° C. while shaking. After 24 hours at 25° C. the tube is opened and the solvent, volatile products and unreacted monomers are allowed to evaporate. A final treatment at 60° C./1.0 mm. Hg for 16 hours removes any remaining volatiles and leaves the product as a viscous, slightly cloudy liquid, weight 8.5 g., conversion 43% of theory. The infra-red spectrum exhibits an absorption at $5.73\mu$ for C=O and no absorption for C=C. The product is titrated for an acid content by dissolving 1 g. in a mixture of 50 ml. of trichloritrifluoroethane and 4 ml. of perfluorotributylamine, adding excess dibutylamine as a 0.2 N solution in dibromotetrafluoroethane, and back titrating with 0.1 N solution of trifluoroacetic acid in dibromotetrafluoroethane. The titration indicates 0.2 meg. of acrylic acid per gram of polymer.

(B) Curing of the preferred terpolymer.—Portions of the above liquid polymer are cured using varying quantities of tris-(methylaziridinyl) phosphine oxide (MAPO).

In each curing run using a different ratio of MAPO to polymer. Runs are made using 1,2,5,5 and 10 equivalents of MAPO to each (1) equivalent of acid. The curing agent is admixed with the liquid terpolymer and cured at 70° C. for 24 hours. The product's physical properties varied with the MAPO concentration going from an elastomeric gum at the lowest concentration to a relatively tough rubber at the highest concentration.

(C) Propellant and Gas Generator Formulations Empolying the Preferred Terpolymers.—Using the procedure of U.S. Pat. 3,193,421, a gas generating composition is prepared by placing 21 parts by weight of the above liquid terpolymer in a suitable blending vessel fitted with a vertical planetary mixer, followed by 2.0 parts by weight of ammonium dichromate combustion catalyst and 28.0 parts by weight of dihydroxyglyoxime coolant, 49 parts by weight of ammonium perchlorate oxidizer, and 3.50 parts by weight of tris (1-(2-methyl)aziridinyl) phosphine oxide. After stirring for 25 minutes, the mixture is poured into a gas generator engine and cured for 24 hours at 70° C. The cured gas generator composition has good physical properties and is highly energetic.

In another run, the above procedure is followed except that RDX is substituted on a weight by weight basis for ammonium perchlorate.

In a further run, 25 parts by weight of the terpolymer of part (A) is admixed with 71 parts by weight of ammonium perchlorate and 4 parts by weight of degassed aluminum powder. After a homogenous mixture is obtained the uncured propellant is cured at 70° C. for 30 hours to produce a propellant having good stress, strain and elasticity.

As indicated by the above example, embodiments and specification, numerous changes and modifications can be made without departing from the inventive concept. The metes and bounds of this invention are best described by the claims which follow.

What is claimed is:

1. Liquid terpolymers of (a) polyhalonitrosoalkanes having no more than 8 carbon atoms and wherein halo is selected from F, Cl and Br atoms, (b) tetrahaloethylenes wherein halo is selected from F, Cl and Br atoms and at least one halo atom is F, and (c) unsaturated monobasic acids selected from acrylic acid, $$CF_2=CHCOOH, CF_2=CFCOOH, CH_3CH=CHCOOH$$
$$CF_3CH=CHCOOH, CH_3CH=C(CH_3)COOH$$
$$CF_3CH=C(CH_3)COOH$$

2. Liquid terpolymers of (a) polyhalonitrosoalkanes having no more than 8 carbon atoms and wherein halo is selected from F, Br and Cl atoms, (b) tetrahaloethylenes wherein halo is selected from F, Br and Cl atoms and at least one halo atom is F, and (c) unsaturated monobasic acids selected from chloro and bromo analogues of $$CF_2=CHCOOH, CF_2=CFCOOH, CF_3CH=CHCOOH$$

and $CF_3CH=C(CH_3)COOH$.

3. Liquid terpolymers of polyfluoronitrosoalkanes, tetrafluoroethylene and acrylic acids selected from the group consisting of acrylic acid and fluorinated acrylic acids, having a molecular weight range of between about 1000 to 8000, said alkanes having up to 8 carbon atoms.

4. The liquid terpolymers of claim 3 wherein the polyfluoronitrosoalkane is trifluoronitrosomethane.

5. The liquid terpolymer of claim 3 wherein the polyfluoronitrosoalkane is pentafluoronitrosoethane.

6. The liquid terpolymer of claim 3 wherein the polyfluoronitrosoalkane is heptafluoronitrosopropane.

7. Liquid terpolymers of polyfluoronitrosoalkanes, tetrafluoroethylene and acrylic acid, having a molecular weight range of between about 1000 to 8000, said alkanes having up to 8 carbon atoms.

8. Liquid terpolymers of trifluoronitrosomethane, tetrafluoroethylene and acrylic acid said trifluoronitrosomethane and tetrafluoroethylene being present in substantial equimolar amounts, and said terpolymers having a molecular weight range of from about 1000 to 8000.

9. The process of preparing terpolymers of polyfluoronitrosoalkanes, polyfluoroethylenes and acrylic acids selected from the group consisting of acrylic acid and halogenated acrylic acids comprising the steps of admixing about equimolar proportions of polyhalonitrosoalkanes having no more than 8 carbon atoms and wherein halo is selected from the group consisting of F, Cl and Br atoms, polyfluoroethylenes and acrylic acids in the presence of a chain stopping polyhalogenated alkane solvent at a temperature in the range from about 0° to about 50° C. until a terpolymer is formed and isolating the terpolymer contained therein.

10. The process of preparing terpolymers of trifluoronitrosomethane, tetrafluoroethylene and acrylic acid comprising the steps of contacting about equimolar proportions of tetrafluoroethylene and trifluoronitrosomethane with excess acrylic acid in the presence of a chain stopping polyhalogenated alkane solvent at a temperature in the range from about 0° to about 50° C. until a terpolymer is formed and isolating the terpolymer contained therein.

11. The process of claim 10 wherein the reaction takes place between about 15–35° C.

References Cited
UNITED STATES PATENTS

| | | | |
|---|---|---|---|
| 3,219,712 | 11/1965 | Hauptschein et al. | 260—653.1 |
| 3,351,644 | 11/1967 | Hauptschein et al. | 260—408 |

LEWIS GOTTS, Primary Examiner

P. J. KILLOS, Assistant Examiner

U.S. Cl. X.R.

44—6 R; 149—19 R, 38 R, 44 R, 92 R